United States Patent [19]
Brazas, Jr.

[11] Patent Number: 5,677,902
[45] Date of Patent: Oct. 14, 1997

[54] BEAM SPLITTER FOR OPTICAL RECORDING

[75] Inventor: John C. Brazas, Jr., Hilton, N.Y.

[73] Assignee: Eastman Kodak Company, Rochester, N.Y.

[21] Appl. No.: 674,225

[22] Filed: Jun. 28, 1996

[51] Int. Cl.⁶ .................................................. G11B 7/00
[52] U.S. Cl. ........................................ 369/109; 369/112
[58] Field of Search ....................................... 369/109, 110, 369/112, 116, 120, 122, 44.23, 44.37, 44.38, 106, 53

[56] References Cited

U.S. PATENT DOCUMENTS

| | | | |
|---|---|---|---|
| 4,779,253 | 10/1988 | Getreuer et al. | 369/109 X |
| 4,978,187 | 12/1990 | Minemura et al. | 369/53 X |
| 5,363,363 | 11/1994 | Gage | 369/116 |
| 5,493,555 | 2/1996 | Kimura et al. | 369/109 X |
| 5,544,143 | 8/1996 | Kay et al. | 369/109 |

OTHER PUBLICATIONS

Applied Optics, vol. 34, No. 4, Feb. 1, 1995, pp. 604–609, of John C. Brazas, Lifeng Li and Amanda L. McKeon.
Chapter 26 of F. Jenkins et al, "Fundamentals of Optics," McGraw Hill, New York.
L.F. Johnson, "Evolution" of grating profiles under ion-beam erosion, Applied Optics, vol. 18, pp. 2259-2574.
Pp. 172-179 of A. Marchant, "Optical Recording: A Technical Overview," Addison-Wesley, Reading, Mass.

Primary Examiner—P. W. Huber
Attorney, Agent, or Firm—Raymond L. Owens

[57] ABSTRACT

In an optical system including an optical source with an effective aperture for generating a radiation beam to be applied to a data track of an optical storage medium, including optics disposed between the optical source and the data track of the optical storage medium which defines an optical axis along which light is projected to the data track and displacing the optical axis of the return beam to cause it to be substantially outside the effective aperture of the optical source to reduce feedback into the optical source, and a constructive interference beam splitter disposed between the optics and the optical source for producing a beam of light projected along the optical axis and defraction beams and including at least one coating of transparent material selected of a predetermined thickness to cause an increase in the amount of light projected along the optical axis and a desired defraction beam by decreasing light in the non-desired defraction beams.

3 Claims, 3 Drawing Sheets

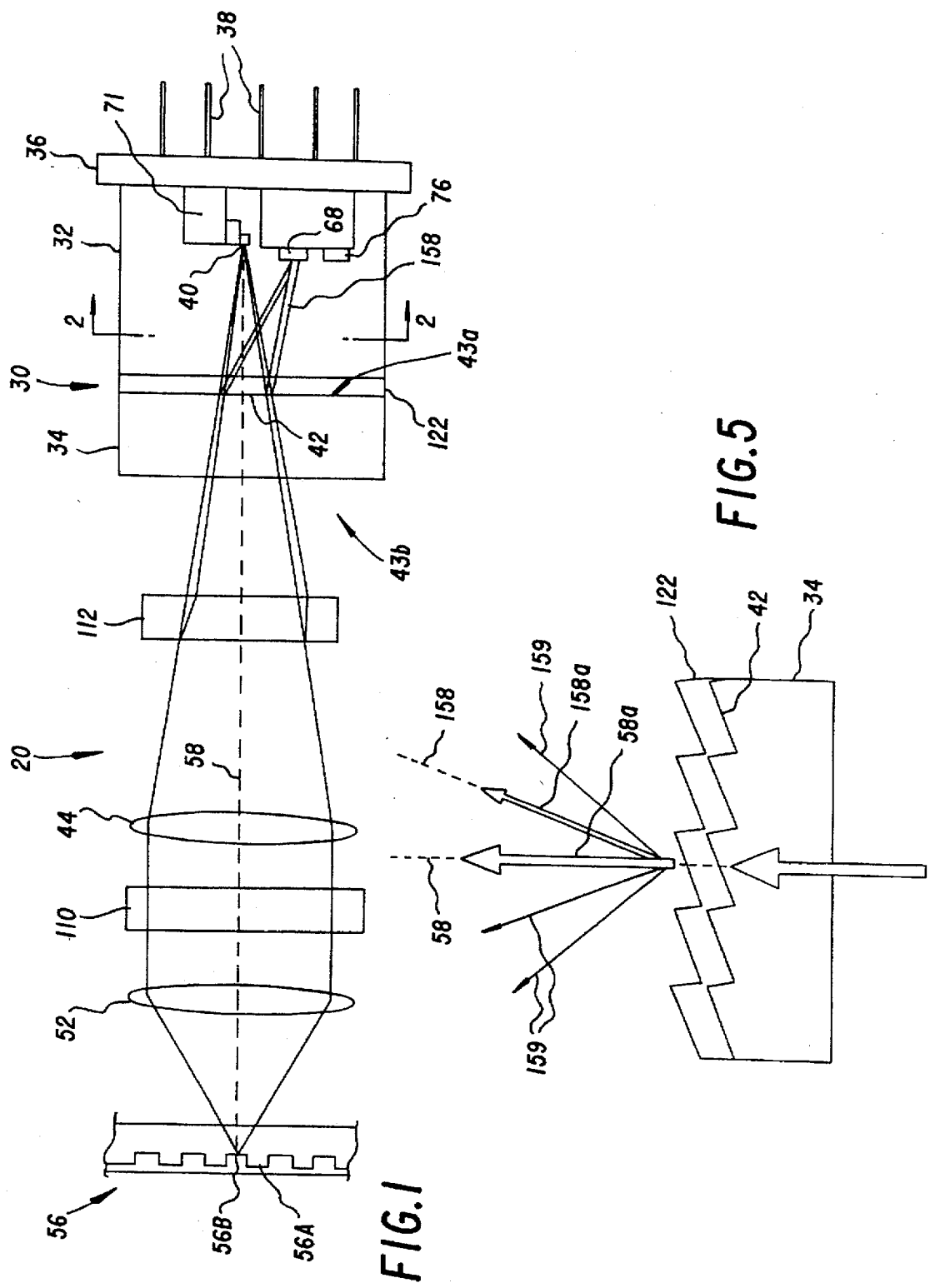

BEAM SPLITTER FOR OPTICAL RECORDING

CROSS-REFERENCE TO RELATED APPLICATIONS

The present invention is related to the following U.S. patent application Ser. No. 08/673,413 entitled "Multi-Element Grating Beam Splitter Using Double Retraction to Reduce Optical Feedback and Associated Light Source Noise"; U.S. patent application Ser. No. 08/671,852 entitled "Multi-Element Grating Beam Splitter in an Optical Recording Device Providing Uniform Beam Splitting Efficiency," both filed concurrently herewith; "Multi-Element Grating Beam Splitter With a Reflection Grating Element For Use in Front Facet Subtraction", U.S. patent application Ser. No. 08/259,587 now U.S. Pat. No. 5,511,059; "Single Return Path Orthogonally-Arranged Optical Focus and Tracking Sensor System," U.S. patent application Ser. No. 08/259,655; and "Read/Write Laser-Detector-grating Unit (LDGU) With An Orthogonally-Arranged Focus and Tracking Sensor System," U.S. patent application Ser. No. 08/259,428, now U.S. Pat. No. 5,544,143, all assigned to the assignee of the present invention. The disclosures of these related applications are incorporated herein by reference.

FIELD OF THE INVENTION

The present invention relates generally to optical read/write heads used in optical information storage and retrieval systems. More particularly, the present invention relates to optical heads which include a laser-detector-grating unit (LDGU) and uses a focus and tracking sensor system to control the position of a radiation beam relative to an optical storage medium.

BACKGROUND OF THE INVENTION

In many optical information storage and retrieval systems, a radiation beam from an optical source is reflected and diffracted from a data track on an optical storage medium. The beam returning from the storage medium may be directed to a detector array that provides signals used to generate, for example, a focus error signal (FES), a tracking error signal (TES) and a data signal. The FES and TES generally drive servo systems for maintaining the radiation beam infocus and on-track, respectively, relative to the storage medium. The data signal is indicative of the data stored on the data track scanned by the radiation beam. The portion of the optical system which generates and processes the radiation beam is generally referred to as an optical head.

The optical head includes a grating beam splitter that directs light along the optical axis to the data track of the optical medium and for detection of the light returning from the optical disk, at least one diffracted beam for producing the FES and TES and data signal. A problem with this arrangement is that the beam splitter produces a number of diffraction beams which are not desired. These beams reduce the intensity of the desired beams.

SUMMARY OF THE INVENTION

It is an object of the present invention to provide an improved beam splitter which causes a greater fraction of light to be directed along the optical axis and in a desired diffracted beam.

This object is achieved by an optical system including an optical source with an effective aperture for generating a radiation beam to be applied to a data track of an optical storage medium, the improvement comprising:

a) optics disposed between the optical source and the data track of the optical storage medium which defines an optical axis along which light is projected to the data track and means for displacing the optical axis of the return beam to cause it to be substantially outside the effective aperture of the optical source to reduce feedback into the optical source; and b) a beam splitter disposed between the optics and the optical source for producing a beam of light projected along the optical axis and defraction beams and including at least one coating of transparent material selected of a predetermined thickness to cause an increase in the amount of light projected along the optical axis and a desired diffracted beam by decreasing light in the non-desired diffracted beams.

BRIEF DESCRIPTION OF THE DRAWINGS

FIG. 1 is a side-sectional view of an optical system which includes an exemplary LDGU in accordance with the present invention;

FIG. 5 is a side view of a beam splitter in accordance with the present invention.

ADVANTAGES

Figure 3:
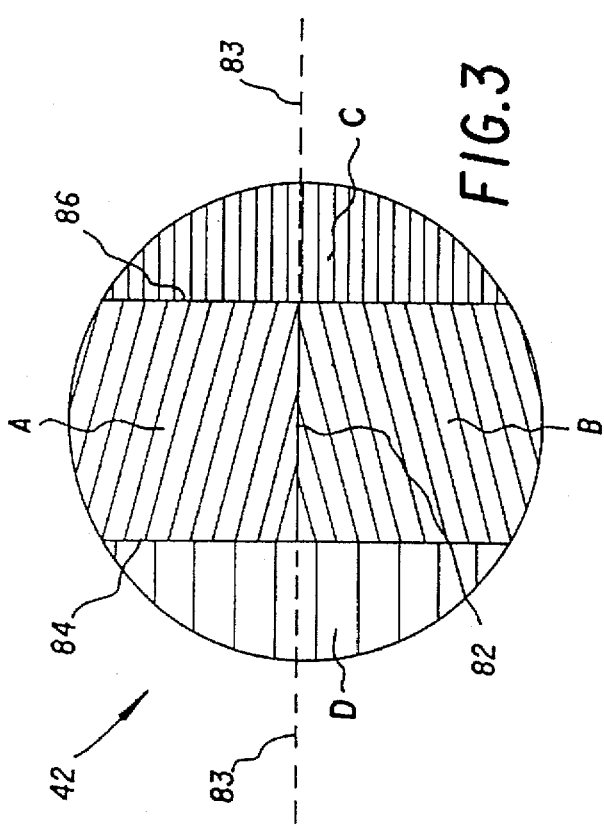
FIG. 3 is a detailed view of an exemplary blazed grating beam splitter in accordance with the present invention.

The beam splitter of the present invention provides increased light in propagating towards the storage medium along the optical axis and in a diffracted beam used for TES, FES and data signal while reducing the light intensity in undesired diffracted beams.

DETAILED DESCRIPTION OF THE PREFERRED EMBODIMENTS

FIG. 1 shows an exemplary optical system 20 in accordance with the present invention. The components of optical system 20 which process, direct and detect the return beam to provide the FES and TES, and in some cases a data signal, may be collectively referred to as a focus and tracking sensor system. Furthermore, although the present invention is particularly well-suited for use in optical read/write heads, it may also provide advantages in other optical applications, including, for example, position sensors.

The optical system 20 includes an LDGU 30 which may be used in an optical read/write head to both read from and write to optical storage media such as recordable CDs. The LDGU 30 combines several components into a single package. The LDGU 30 includes a package housing 32, a transparent substrate 34, and a package base 36. The transparent substrate 34 may be glass, plastic, or other transparent material. Although the package shown is a can type package, the various components of LDGU 30 may be enclosed in other types of packages as required for a given application. A number of contact pins 38 protrude from the package base 36 for connecting the LDGU 30 to external electronic circuitry (not shown). The LDGU 30 also includes an optical source 40 which is typically a laser diode. Alternatively, the optical source 40 may be a compact laser. The optical source 40 generates a radiation beam which is incident on a grating beam splitter 42 formed on an inner surface 43a of the transparent substrate 34. The grating beam splitter 42 is preferably a blazed grating beam splitter.

The transparent substrate 34 is arranged between the optical source 40 and an optical storage medium 56 such that the radiation beam passes through the substrate. A zeroth order diffraction component of the radiation beam passes undetected through the transparent substrate 34 and the grating beam splitter 42 formed thereon and is collimated by collimating lens 44. The radiation beam is then focused by an objective lens 52 onto an optical storage medium 56, which may be, for example, a recordable CD. Disposed between the objective lens 52 and the collimating lens 44 is a quarter-wave plate 110 which will be discussed hereafter. Moreover, a crystalline plate 112 is also disposed in the optical path between the collimating lens 44 and the transparent substrate 34. This plate will be discussed hereafter. Only a portion of the optical storage medium 56 is shown in FIG. 1. The radiation beam is used to store and retrieve information from the optical storage medium 56, and typically has a linear polarization. Alternatively, the incident radiation beam could have other polarizations.

Any of a number of well known techniques may be used to form the blazed grating beam splitter 42 on the transparent substrate 34. For example, appropriate grating patterns could be photolithographically formed in a layer of photoresist on a surface of substrate 34, an ion milling beam could be used to mill the grating patterns onto the substrate 34, or the grating patterns could be formed using molded clear epoxy or resins. In addition, the grating beam splitter could be formed using holographic techniques, in which, for example, two or more laser beams are used to create an interference pattern in a thin layer of photoresist. These and other grating formation techniques are well-known in the art and will not be further described herein. Furthermore, although the grating beam splitter 42 is shown in LDGU 30 on an inner surface of transparent substrate 34, it could also be formed on an outer surface of the substrate, or partially formed on both inner and outer surfaces of the substrate. It may be preferable in many applications, however, to form the grating beam splitter 42 on an inner surface in order to protect it from contaminants.

In accordance with the present invention, the fraction of light reaching the detector array 68 with respect to the sum of all beams formed by diffraction at the grating element 42 is increased. In the embodiment shown in FIG. 5, a layer 122 composed of a single or multiple coatings of transparent material is added to substantially affect the fraction of light diverted to the detector array 68. Optical system 20 includes a layer 122 composed of a single or multiple thin films having their thickness and refractive index selected to affect the efficiency of diffraction into the diffracted optical beam 158a along optical axis 158. Layer 122 provides an optical structure which demonstrates optical interference affects as described in Chapter 26 of F. Jenkins and H. White, "Fundamentals of Optics," McGraw Hill, New York. The optical source 40 of the standard optical system 20 produces plane polarized light that exits the LDGU 30 and passes through the optical system 20. The design and selection of materials used for layer 122 may be used to affect polarization of light in a similar fashion or in very different ways.

The thickness and index of each thin film composing layer 122 contributes to multiple internal reflections to provide constructive or destructive interference effects for the beams exiting from the layer 122. If the layer 122 is designed properly, the beams propagating along optical axis 58 and 158 will experience constructive interference and will contain a greater fraction of the light than if layer 122 was not present. The other detectable transmitted optical beams 159 appearing due to diffraction from the grating beam splitter 42 are not essential for operation of the device and should contain a lesser fraction of light. FIG 5 illustrates a beam splitter and the operation of layer 122 when a single thin film is deposited to a thickness less than the height associated with the grating grooves of element 42. The coating shown is conformal to the surface of the grating beam splitter 42 although this is not an absolute requirement. For a further discussion on conformal coatings on grating see Applied Optics, Vol. 34, No. 4, Feb. 1, 1995, pp. 604–609, of John C. Brazas, Lifeng Li and Amanda L. McKeon.

Figure 6:
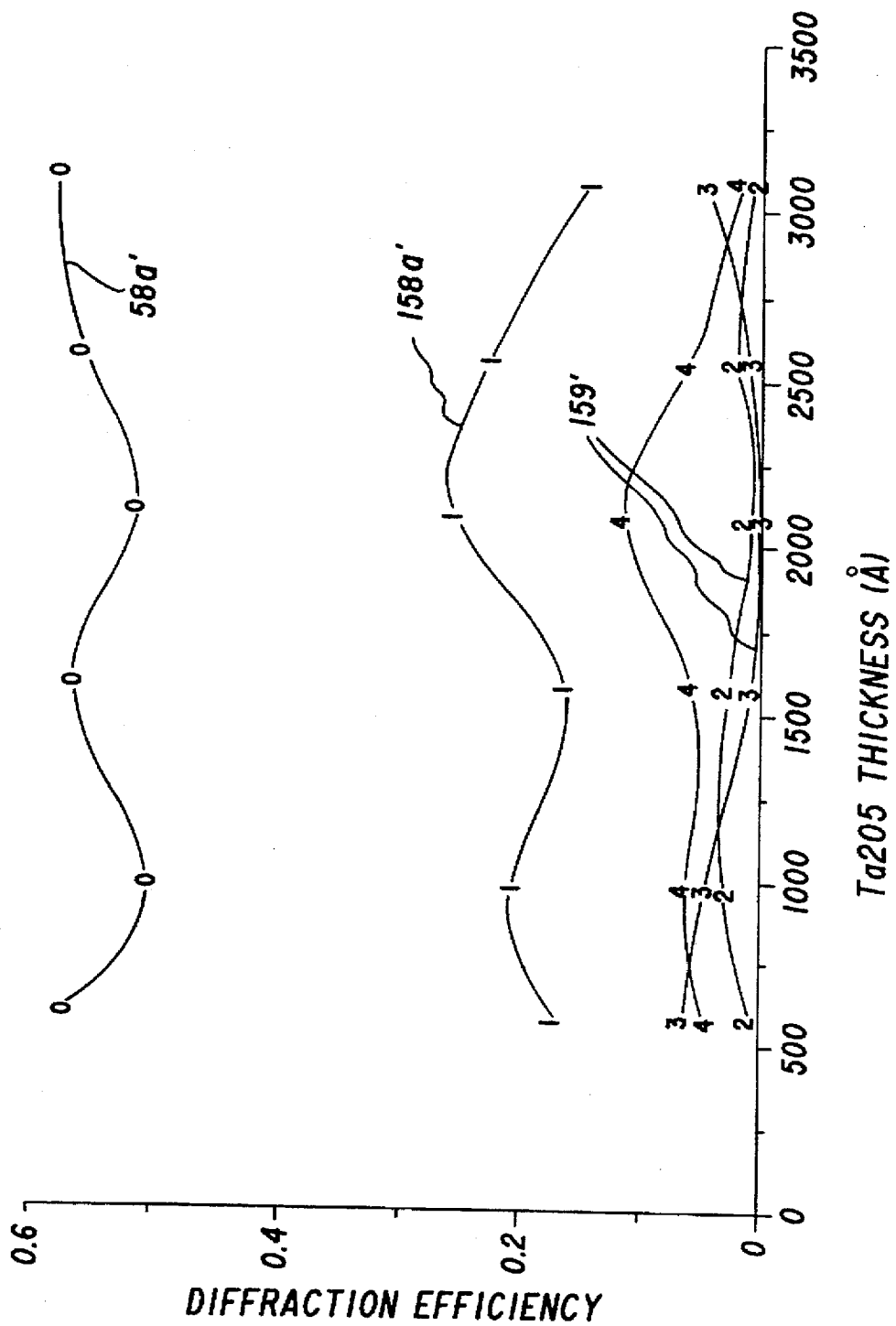
FIG. 6 is a plot of diffraction efficiency versus thickness of layer 122 shown in FIG. 5 composed of tantalum pentoxide.

In accordance with the present invention, by using a semiconductor laser for the light source 40, and an appropriately designed grating element 42 on a quartz plate 34. A layer 122 composed of a thin film of tantalum pentoxide produced by vacuum deposition was added to the grating element to provide a profile like that illustrated in FIG. 5. A range of thickness for the layer 122 were prepared and examined for the fraction of light in the optical beams appearing in FIG. 5, not essential optical beams 159 and optical beams 58a and 158a on the optical axes 58 and 158, respectively. FIG. 6 shows a plot of the results where the results were normalized with respect to a sum of the intensities of the optical beams exiting the grating element 42. The data lines 58a', 158a', and 159' represent the results for the corresponding optical beams 58a, 158a, and 159. With the addition of about 0.2 μm of tantalum pentoxide, the fraction of light in the optical beams 58a and 158a reached theft highest fractions. In this scan analysis, the fraction of light in optical beams 58a and 158a was substantially increased by the addition of layer 122 to more efficiently utilize the available power from the light source 40 and increase the signal levels and therefore reduce the effect noise levels of the focus error, tracking error and data signals.

The functionality of plates 112 and 34 of FIG. 1 could be combined. For instance, the grating plate 34 could be composed of a crystalline material properly configured within the plate to provide the double refraction characteristic required and the surface of the plate would support the grating 42.

Another form of the invention could include moving the grating element 42 and layer 122 from the inner surface 43a to an outer surface 43b of the plate 34. The layer 122 can also be used to affect the ratio of light between optical optical beams 58a and 158a which also affects the intensity of light appearing in both beams in comparison to the sum of all beams.

In another embodiment of the present invention, the transparent substrate could be, for example, a thin film on which a grating beam splitter is formed. The thin film could be mounted in an aperture (not shown) in LDGU 30 such that the incident radiation beam and return beam pass through the thin film transparent substrate and the grating beam splitter. In these and other embodiments, the grating beam splitter may alternatively be formed within the transparent substrate, rather than on an inner or outer surface thereof. The term "transparent substrate" is defined herein as any transparent material, including glass, plastic or film, which may be used to support a grating beam splitter formed therein or thereon.

The optical storage medium 56 includes a surface 56A having a number of data tracks formed thereon. Each data track 56B is shown in cross-section and generally extends in a direction perpendicular to the plane of the drawing. The data track 56B is a type of diffraction component-generating structure. The structure diffracts the incident radiation beam because the depth of the structure is generally a fraction of the wavelength of the incident radiation beam and introduces phase differences in the return beam. Although the data track 56B is shown as a raised structure in the exemplary optical system 20 of FIG. 1, a data track in accordance with the present invention may also be, for example, a groove in the storage medium, a region between two grooves in the optical storage medium 56, a series of unconnected raised regions, or other optical path structures of appropriate dimension and refractive index such that diffraction patterns are created in response to an incident radiation beam.

It should be noted that although the data tracks are generally arranged in a spiral configuration on an optical storage medium such as a recordable CD, a given portion of the data track 56B around a point currently illuminated by the incident radiation beam will exhibit little curvature and therefore such a portion may be considered substantially straight. A projection of such a portion of data track 56B on the grating beam splitter 42 will generally lie in a plane separating part of the grating beam splitter 42 into first and second grating elements. A dashed line 58 is drawn in FIG. 1 between a currently illuminated data track 56B and the center of the optical source 40. The line 58 represents an optical axis of the incident radiation beam and is perpendicular to the data track 56B and the projection thereof onto grating beam splitter 42. A reference plane is defined herein by the optical axis 58 of the incident radiation beam and a tangent to the data track 56B at the point currently illuminated by the incident radiation beam. The substantially straight portion of the data track 56B may be considered pan of the tangent to the data track 56B. The projection of data track 56B onto grating beam splitter 42 also generally lies within the reference plane.

The data track 56B reflects and diffracts the incident radiation beam applied thereto. The data track 56B reflects and diffracts the incident radiation beam applied thereto. The optical components include the lenses 44 and 52, quarter-wave plate 110, crystalline plate 112, and disposed between the grating beam splitter 42 and the data track 56B of the optical storage medium actually defines the optical axis along which light is projected as shown in FIG. 1. The quarter-wave plate 110 and a crystalline plate 112 causes the displacement of the optical beam returning from the optical storage medium 56 to produce a displaced optical axis 158. This displacement will cause the optical beam to fall beyond the effective aperture of the optical source 40 and thus reduce optical feedback and associated light source noise. The reflected and diffracted incident radiation beam will be referred to herein as a return beam. The return beam is then incident on the grating beam splitter 42, which separates the return beam by principles of diffraction into a number of different portions. These portions are directed towards a detector array 68. The detector array 68 detects the various portions of the return beam and generates signals which, when combined in the manner described below, provide a TES, an FES and a data signal. The reflected and diffracted incident radiation beam will be referred to herein as a return beam. The return beam is then incident on the grating beam splitter 42, which separates the return beam by principles of diffraction into a number of different portions. These portions are directed towards a detector array 68. The detector array 68 detects the various portions of the return beam and generates signals which, when combined in the manner described below, provide a TES, an FES and a data signal.

Other noise reduction techniques based on a signal indicative of optical source power may also be used.

Front facet subtraction reduces the effect of optical source noise in a detected return beam. Many commonly-used optical sources have a number of different lasing modes, each producing a radiation beam at a slightly different wavelength. Part of the return beam reflected from the optical storage medium returns to the optical source and may produce longitudinal mode-hopping, in which the source hops between two or more of its lasing modes. Longitudinal mode-hopping generally causes intensity noise on the radiation beam produced by the source. Front facet subtraction involves detecting a portion of the incident radiation beam before it arrives at the optical storage medium, adjusting its amplitude and phase delay, and subtracting it from the detected return beam. The technique is referred to as front facet subtraction because the incident radiation beam, a portion of which is subtracted from the detected return beam, generally exits the front facet of a laser diode optical source. Front facet subtraction may be applied in the present invention. Additional detail may be found in the above-cited U.S. Pat. No. 5,363,363 issued Nov. 8, 1994 to Gage entitled Apparatus and Method for Laser Noise Cancellation in an Optical Storage System Using a Front Facet Monitor Signal.

Returning to FIG. 1 the optical system 20 eliminates the need for a reflecting element to collect light exiting the front facet of the laser onto a detector is eliminated. Optical system 20 includes the quarter-wave plate 110 and the crystalline plate 112 made up of a transparent and crystalline material capable of producing the effect of double refraction as described in Chapter 26 of F. Jenkins et al, "Fundamentals of Optics," McGraw Hill, New York. The optical source 40 for the standard optical system 20 produces plane polarized light that exits the LDGU and passes through elements 112 and 44 with the polarization unaffected. Upon passing through the quarter-wave plate 110, the light becomes circularly polarized and continues with this characteristic to the optical storage medium 56. The light reflected from the optical storage medium 56 returns through the objective lens 52 and upon passage through the quarter-wave plate 110 becomes linearly polarized orthoganol to the original orientation of the polarization. Upon reaching the crystalline plate 112 the current polarization of light will be refracted within the crystal causing a displacement of the beam from the optical axis 58 of the incident radiation beam and to form a parallel optical axis 158 reentering the LDGU 30. As described by Jenkins et al, the amount of separation between the optical axis 58 and the displaced optical axis 158 is determined by the displace of the beam within crystalline plate 112 and is dependent on the selection of the crystalline material, orientation of the crystalline axis within the crystalline plate 112, and the optical pathlength through the crystalline plate 112. It is possible to position the detector array 68 to efficiently collect the diffracted order resulting from grating 42. The re-entry of light into the light source 40 will be substantially reduced and may not occur if the displaced optical axis 158 falls beyond the effective aperture of light source 40. This will substantially reduce if not eliminate the noise associated with mode hopping of the light source 40 attributed to feedback. Alternatively, the crystalline plate 112 can be rotated to be aligned with the incident beam polarization so that the beam displacement takes place as the light propagates towards optical storage medium 56. The beam returning from the optical storage medium 56 will not be effected by the crystalline plate 112 and so, once again, the return beam falls beyond the effective aperture of light source 40.

Figure 2:
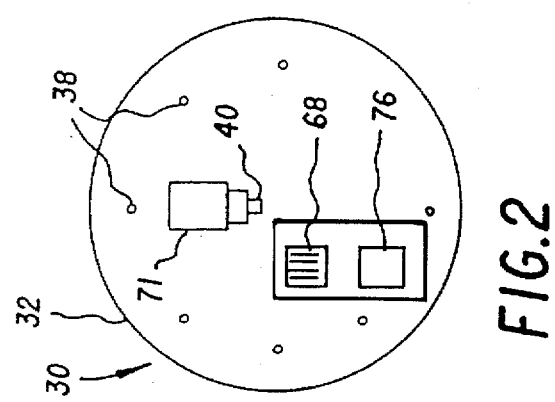
FIG. 2 is a view of the exemplary LDGU of FIG. 1 taken along the section line 2—2.

FIG. 2 shows a view of the LDGU 30 taken along the section line 2—2 of FIG. 1. A post 71 holds the optical source 40 in place and also serves as a heat sink. The exemplary LDGU 30 also includes a preamplifier 76 connected to the detector array 68 for amplifying signals generated in the detector army 68. The amplified signals from preamplifier 76 are then supplied to electronic circuitry (not shown) for combining the signals to generate an FES, a TES and a data signal in a manner to be described below. The preamplifier 76 preferably includes a separate low-noise amplifier for each detector in the detector array 68 and may be implemented as, for example, an Application-Specific Integrated Circuit (ASIC). Exemplary types of preamplifiers which may be used including transimpendance amplifiers. The placement of preamplifier 76 within LDGU 30 allows for short lead lines between a given detector and its corresponding low-noise amplifier, and therefore reduces noise pickup and allows an increase in signal bandwidth. The electrical interconnections between the low-noise amplifiers in preamplifier 76 and the detectors in detector array 68 would be readily apparent to one skilled in the art and are therefore not shown. In alternative embodiments, the preamplifier 76 could be eliminated.

FIG. 3 shows a detailed view, in a plane parallel to the plane of section 2—2, of an exemplary blazed grating beam splitter 42 in accordance with the present invention. The exemplary blazed grating beam splitter 42 includes first, second, third, and fourth grating elements A, B, C and D, respectively. In a preferred embodiment of the present invention, the grating elements A, B, C and D of the grating beam splitter 42 are blazed gratings. Blazed gratings are commonly used in optical systems and their operation and high efficiency properties are generally well-known. In alternative embodiments, other types of gratings could be used, including, for example, sinusoidal gratings, ruled gratings and holographic structures. Each grating element includes a grating pattern as shown in FIG. 3. The line spacings, line widths, blaze angles, and other dimensions of the grating patterns in each grating element may vary depending upon the application, and can be readily determined in a well-known manner.

The first and second grating elements A and B of FIG. 3 are divided along a line 82 which is parallel to the above-described tangent to the data track 56B. The line 82 is also substantially parallel to a projection 83 of the tangent to the data track 56B onto the grating beam splitter 42, and lies in the reference plane defined by the optical axis 58 and the tangent to the data track 56B. The third and fourth grating elements C and D are arranged adjacent to and on opposite sides of the first and second grating elements A and B. The elements C and D are separated from elements A and B by lines 84 and 86, respectively, which are perpendicular to the data track 56B or the projection 83 of the data track 56B on the grating beam splitter 42. The grating elements A, B, C and D separate the return beam into four different portions, along planes which contain the lines 82, 84 and 86. The first and second grating elements A and B separate the return beam along the reference plane defined above. In other embodiments, the first and second grating elements could separate the return beam along another plane substantially parallel to the reference plane, or along two different planes substantially parallel to the reference plane. The third and fourth grating elements C and D separate the return beam along planes substantially perpendicular to the reference plane. In this exemplary embodiment, each of the resulting portions of the return beam is focused on a different detector in detector array 68.

FIG. 3 shows the grating of the LDGU in accordance with the present invention. For the grating shown, the period of the grating corrugation are substantially similar for each of the grating elements A, B, C, and D which separate the return beam into four different portions, along the planes which contain the lines 82, 84, and 86. The orientations of the corrugation for each grating element is rotated sufficiently to separate the light beams and allow for collection of light onto discrete detectors within the detector array 68 of FIG. 2.

Figure 4:
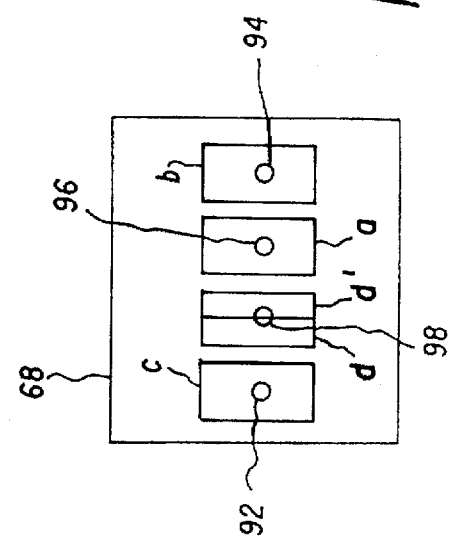
FIG. 4 is a detailed view of an exemplary detector array in accordance with the present invention.

FIG. 2 and FIG. 4 illustrate the detector array 68 including four detector a, b, c and d, d' for detecting the first, second, third and fourth portions of the return beam, respectively. Exemplary focus spots 92, 94, 96, and 98 indicate an area of each detector on which the first, second, third, and forth return beam portions, respectively may be focused when the incident radiation beam is on-track and in-focus relative to the optical storage media.

FIG. 4 shows the exemplary detector array 68 in greater detail. The detector array 68 includes four detectors a, b, c and d, d' for detecting the first, second, third and fourth portions of the return beam, respectively. The first, second and third detectors are single element detectors, designated in FIG. 4 as detector elements a, b and c, respectively. The fourth detector is a dual element detector with detector elements d and d'. In other embodiments, the third detector c may be a dual element detector rather than a single element detector. Each detector element may be, for example, a photodiode, a group of photodiodes, or another type of photodetector. Exemplary focus spots 92, 94, 96 and 98 indicate an area of each detector on which the first, second, third and fourth return beam portions, respectively, may be focused when the incident radiation beam is on-track and in-focus relative to the optical storage medium. It should be emphasized that this particular arrangement of detectors is exemplary only. For example, the detectors shown may include additional detector elements or fewer detector elements in other embodiments of the present invention. In addition, each of the detectors need not be part of a single detector array. As will be discussed in greater detail below, the grating elements and corresponding detector elements are arranged such that the optical cross-talk between tracking and focus signals is minimized.

In the exemplary embodiment of FIG. 3, the grating patterns shown are suitable for directing the first, second, third and fourth separated portions of the return beam onto detectors a, b, c and d, d', respectively, of detector array 68. The pattern line spacings in element C are wider than those in D, and in both C and D the pattern lines are substantially parallel to line 82. The pattern line spacings in elements A and B are the same, while narrower than those in C and wider than those in D. In addition, the pattern lines in A and B are slanted at equal but opposite angles relative to line 82.

It should also be noted that the arrangement of grating elements shown in FIG. 3 is exemplary only, and alternative embodiments of the present invention may utilize other arrangements. For example, the various elements of the grating beam splitter 42 may be separated by lines which deviate from the parallel or perpendicular lines shown in FIG. 3 by up to about ten percent. The terms "substantially parallel" and "substantially perpendicular," as used herein, include deviations of at least ten percent from parallel and perpendicular, respectively. Although the amount of optical cross-talk may increase as a result of such deviations, an improvement over most current prior art systems would generally still be obtained. In addition, although a four element grating beam splitter may be preferred in many applications, the grating beam splitter could include more or less than four grating elements. For example, an embodiment which does not require a data signal may include only the three grating elements A, B and C, or A, B and D.

In general, the return beam includes a reflected component, also referred to as a zeroth order diffraction component, and a number of higher order diffraction components diffracted by the surface of the optical storage medium. A given diffraction order generally includes both a positive and a negative diffraction component. Although higher order diffraction components may also be present in the return beam, the present invention can be readily understood without further consideration of diffraction components greater than first order. When the reflected component overlaps with the first order diffracted components, interference occurs. This interference may be directed to detectors a and b to provide, for example, a push-pull tracking error signal, as will be described below. The two first order diffraction components may be, for example, contiguous with an optical axis of the incident radiation beam, and therefore both may overlap with the reflected component. It should be noted, however, that the present invention may be utilized in systems in which the positive and negative diffraction components overlap with each other as well as with the reflected components. Additional detail regarding diffraction components may be found in, for example, the above-cited U.S. patent application Ser. No. 07/998,179, and pp. 172-179 of A. Marchant, "Optical Recording: A Technical Overview," Addison-Wesley, Reading, Mass., which are incorporated by reference herein.

A tracking error signal (TES) may be generated from the first and second portions of the return beam incident on the first and second detectors a and b, respectively, of the detector array 68. The TES is generated in accordance with the relationship a-b, which indicates that the signal generated by detector element b is subtracted from the signal generated by detector element a. As a result of passing through the above-described grating beam splitter 42, the first and second portions of the return beam each may include a different diffraction component of a given diffraction order, diffracted from the optical storage medium, as well as undiffracted components. The different diffraction component may be either a positive or a negative diffraction component. It should be understood that, in general, only part of any given diffraction component, rather than the entire component, falls within the objective lens aperture and will therefore be incident on grating beam splitter 42. References made herein to a particular diffraction component are thus meant to include any pan of that component.

A focus error signal (FES) may be generated from the fourth portion of the return beam incident on the fourth detector d, d' of the detector array 68. An FES is generated in accordance with the relationship d-d', which indicates that the signal generated by detector element d' is subtracted from the signal generated by detector element d. As a result of passing through the above-described grating beam splitter 42, the third and fourth portions of the return beam include both positive and negative diffraction components of a given diffraction order, diffracted from the optical storage medium, as well as undiffracted components. Each of the detector elements d and d' thus receive both diffraction components of a given diffraction order. By subtracting the signals resulting from detection of the fourth portion of the return beam on detector elements d and d', the diffraction components of a given diffraction order substantially cancel out, thereby reducing optical cross-talk.

A data signal, indicative of the data stored on data track 56B, may also be generated in the optical system 20. For example, a data signal could be generated by combining the signals generated by each detector element in the detector array 68, in accordance with the relationship a+b+c+d+d'. Alternatively, signals from a subset of detector elements could be combined to generate a data signal.

Optical system 20 may also include electronic circuitry (not shown) for combining signals generated by the detector elements of detector array 68. The electronic circuitry may include adders, subtracters or other types of signal combiners for generating focus error, tracking error and data signals in accordance with the above-described relationships. Such electronic circuitry is generally well-known in the art and will therefore not be further described herein.

In general, the orientation and location of the detector elements a and b is not critical to the operation of the present invention, and the arrangement in FIG. 4 or other alternative arrangements may be chosen in order to satisfy detector array packaging constraints or other criteria. The position of the fourth detector elements d and d' may also be varied but the division between the pair should generally be along a line substantially perpendicular to the data track 56B, or the projection 83 of the data track 56B on the grating beam splitter 42. This division line is also substantially perpendicular to the above-defined reference plane.

The grating beam splitter 42 of the present invention may be replaced with other optical devices capable of dividing the return beam reflected and diffracted from a data track into a number of distinct portions in accordance with the above description. Alternatives to the grating beam splitter 42 include, for example, holograms. In addition, as mentioned above, the grating or other optical device used to separate the return beam into its respective portions may include more or less than four elements. The elements could be suitably arranged to separate the return beam into portions which, when detected, generate signals which may be combined in accordance with the present invention such that optical cross-talk is minimized.

One method of fabricating the grating beam splitter 42 is through use of in vacuo ion milling of photoresist as described by L. F. Johnson, "Evolution" of grating profiles under ion-beam erosion, Applied Optics, Vol. 18, pp. 2259-2574. In addition, the grating can be bleed using this method to control the efficiency of beam splitting. However, because the discrete signal from detectors a, b, c, d and d' are used in simple summing and differencing equations to obtain the focus error, tracking error and data signals they should be substantially equivalent in their beam splitting efficiency to produce the desirable results in these signals for multiple reasons. First, if the grating elements pairs of A and B or C and D have significantly different beam splitting efficiencies, the signals of focus error and tracking error, respectively, may not take the proper form for correction of the error of positioning the optical storage media. Second, the placement of the dividing planes containing lines 82, 84 and 86 would have to adjusted to accommodate any differences. Third, the non-uniform beam splitting characteristics may adversely affect the beam reaching the optical recording media.

For these reasons and other potential issues, the efficiency of the grating elements A, B, C and D of 42 should be substantially equivalent. When substantially different grating periods are selected for the grating element to control the position of the spots 92, 94, 96 and 98 on a detector array 68. A distinct blaze is needed for each grating period to produce substantially equivalent diffraction efficiencies for each grating element Using the method of ion-beam erosion described in the reference cited above, only the areas needing the same blaze can be produced during the same processing steps of fabrication. Thus, the number of grating elements having a unique blaze will provide an indication of the number of elements that must be processed distinctly using these fabrication methods and will be useful to estimate the difficulty of fabricating the grating element 42.

Although the foregoing detailed description has illustrated the present invention primarily in terms of a particular optical information storage and retrieval system, it should be understood that the embodiments described are exemplary only. Many variations may be made in the arrangements shown, including, for example, the type of grating beam splitter used to separate the return beam and the arrangement, shape and number of grating elements, the number of portions into which the return beam is separated, the arrangement of detectors and detector elements onto which the portions of the return beam are focused, and the type and arrangement of optical components for directing the incident and return radiation beams in the optical system.

Although the foregoing detailed description has illustrated the present invention primarily in terms of a particular optical information storage and retrieval system, it should be understood that the embodiments described are exemplary only. Many variations may be made in the arrangements shown, including, for example, the type of grating beam splitter used to separate the return beam and the arrangement, shape and number of grating elements, the number of portions into which the return beam is separated, the arrangement of detectors and detector elements onto which the portions of the return beam are focused, and the type and arrangement of optical components for directing the incident and return radiation beams in the optical system. Additional variations may be made in the arrangements shown above that affect the efficiency and ratio of light in the appropriate beams, for example, additional materials that could be used in place of the example above or combined to be more or less effective in controlling the fraction of light in the important optical beams. Also, the arrangement of optical components for directing the incident and return radiation beams in the optical system could be altered. These and other alternatives and variations will be readily apparent to those skilled in the art, and the present invention is therefore limited only by the appended claims.

PARTS LIST

A,B,C,D
grating elements
a,b,c,d,d' detectors
20 optical system
30 laser-detector-grating unit (LDGU)
32 package housing
34 transparent substrate
36 package base
38 contact pins
40 optical source
42 grating
43 inner surface
43$a$ inner surface
43$b$ outer surface
44 collimating lens
52 objective lens
56 optical storage medium
56A optical storage medium surface
56B data track
58 optical axis
58$a$ optical beam
58$a'$ data lines
68 detector array
71 post
76 preamplifier
82 line
83 projection
84, 86 line
92, 94, 96, 98 focus spots PARTS LIST (con't)

110 quarter-wave plate
112 crystalline plate
122 layer
158 optical axis
158$a$ optical beam
158' data lines
159 non-essential optical beam
158' data lines

I claim:

1. In an optical system including an optical source with an effective aperture for generating a radiation beam to be applied to a data track of an optical storage medium, the improvement comprising:

a) optics disposed between the optical source and the data track of the optical storage medium which defines an optical axis along which light is projected to the data track and means for displacing the optical axis of the return beam to cause it to be substantially outside the effective aperture of the optical source to reduce feedback into the optical source; and b) a constructive interference beam splitter disposed between the optics and the optical source for producing a beam of light projected along the optical axis and defraction beams and including at least one coating of transparent material selected of a predetermined thickness to cause an increase in the amount of light projected along the optical axis and a desired defraction beam by decreasing light in the non-desired defraction beams.

2. The optical system of claim 1 wherein the beam splitter includes a grating dement and a composite layer formed of multiple coatings of transparent material formed on the grating element.

3. The optical system of claim 2 wherein the multiple coatings are made of pantalum pentoxide.

* * * * *